United States Patent [19]
Pernice et al.

[11] Patent Number: 5,956,329
[45] Date of Patent: Sep. 21, 1999

[54] METHOD OF PACKET-WISE DATA TRANSMISSION IN A MOBILE RADIO NETWORK

[75] Inventors: Frieder Pernice, Gross-Zimmern; Ansgar Bergmann, Bonn, both of Germany

[73] Assignee: DeTeMobil Deutsche Telekom MobilNet GmbH, Bonn, Germany

[21] Appl. No.: 08/687,374

[22] PCT Filed: Feb. 1, 1995

[86] PCT No.: PCT/DE95/00121

§ 371 Date: Sep. 18, 1996

§ 102(e) Date: Sep. 18, 1996

[87] PCT Pub. No.: WO95/21508

PCT Pub. Date: Aug. 10, 1995

[30] Foreign Application Priority Data

Feb. 2, 1994 [DE] Germany ............................. 44 02 903

[51] Int. Cl.[6] ...................................................... H04J 3/00
[52] U.S. Cl. ............................................ 370/336; 370/349
[58] Field of Search ..................................... 370/328, 329, 370/330, 336, 337, 341, 345, 346, 347, 348, 349; 455/422, 455, 458, 463, 464, 39, 507, 509, 510, 515, 516, 517; 371/48, 49.1

[56] References Cited

U.S. PATENT DOCUMENTS

| | | | |
|---|---|---|---|
| 5,101,500 | 3/1992 | Marui | 455/32.1 |
| 5,420,864 | 5/1995 | Dahlin et al. | 370/347 |
| 5,420,911 | 5/1995 | Dahlin et al. | 455/553 |
| 5,437,053 | 7/1995 | Sawa et al. | 455/551 |
| 5,481,539 | 1/1996 | Hershey et al. | 370/312 |
| 5,502,721 | 3/1996 | Pohjakallio | 370/336 |
| 5,521,925 | 5/1996 | Merakos et al. | 370/337 |
| 5,563,895 | 10/1996 | Malkamaki et al. | 370/347 |
| 5,603,081 | 2/1997 | Raith et al. | 455/435 |
| 5,604,744 | 2/1997 | Andersson et al. | 370/347 |
| 5,640,395 | 6/1997 | Hamalainen et al. | 371/32 |
| 5,655,215 | 8/1997 | Diachina et al. | 455/426 |
| 5,812,947 | 9/1998 | Dent | 455/427 |

*Primary Examiner*—Chi H. Pham
*Assistant Examiner*—Kwang B. Yao
*Attorney, Agent, or Firm*—Browdy and Neimark

[57] ABSTRACT

A process for transmitting data in packets in a radio system with mobile and base stations labels the packets with identification or code numbers which are used to route the packets over data traffic channels characterized in the allocated control channels as those containing the data packets by means of the identification number.

20 Claims, 2 Drawing Sheets

METHOD OF PACKET-WISE DATA TRANSMISSION IN A MOBILE RADIO NETWORK

FIELD OF THE INVENTION

The invention relates to methods of packet-wise data transmission in a mobile radio network comprising mobile stations and base stations.

REVIEW OF THE RELATED TECHNOLOGY

Packet-wise data transmission, which is offered by Deutsche Telekom as Datex-P Service, for example, has the advantage that transmission capacity is only required when data are actually being transmitted. Nevertheless, for the entire time, that is, during transmission of the data packets and during pauses between transmissions, a pseudo-permanent connection exists between the subscribers, so no new connection need be established for each data block to be transmitted.

Besides stationary networks for example the conventional telephone network, mobile radio networks have also become known in which radio connections can be established between mobile stations and a base station serving a respective local region (cell), in which instance a plurality of time slots is available at a particular frequency. An example of this type of mobile radio network is the "European Digital Cellular Telecommunication System," which is described in the Technical Specification ETSI-SMG, GSM 05.01, version 4.0.1, October 1992, which was published by the European Telecommunications Standards Institute. This system is called GSM (global system for mobile communications).

German Patent 33 28 601 C1 discloses measures for accelerating the establishment of the connection in a through-switching network, with which the following can be accomplished: a connection can also be established in an intermediate transmission mode, with an identifier being assigned for this transmission mode; devices for recognizing the identifier are provided at the network controls; a network control can only create a connection path in reaction to a request for data transmission from an identified connection; and a holding state is possible for the established connection in the intermediate transmission mode, during which the connection path is available for another transmission of data. These measures, which are typical for a stationary network, are not suited for operation within a mobile radio network, however.

A proposal for a mobile radio network based on packet-wise data transmission has become known from D. J. Goodman, "Trends in Cellular and Cordless Communications" in IEEE Communications Magazine, June 1991, pages 31 through 40. In this instance, a control is provided that is essentially distinguished from those in existing mobile radio networks that a characteristic variable is also transmitted in the packet head, which variable identifies the type of transmitted information.

SUMMARY OF THE INVENTION

It is the object of the present invention to permit packet-wise data transmission in a mobile radio network comprising mobile stations and base stations.

In accordance with the invention, this object is accomplished in that during establishment of a radio connection for packet wise data transmission, a traffic channel and an identification number that is valid for the respective packet-wise data transmission are allocated to the respective participating mobile station, the transmission of the individual data packets is effected in the allocated traffic channels, a common control channel is available to a plurality of mobile stations to which the traffic channel is allocated for packet-wise data transmission, and data packets in the common control channel are characterized as belonging to the respective mobile station with the use of the identification number.

The method of the invention has the advantage that existing devices in mobile radio networks of this type can also be used extensively for packet-wise data transmission. Moreover, options exist for configuring the method of the invention in detail to meet the requirements. For example, it is possible to define the packet length or the maximum delay time required for transmitting a data packet.

In accordance with a modification, compatibility with existing services is made possible in that, in a mobile radio network in accordance with the GSM standard, RACH channels and time slots of predetermined frames of a dedicated channel are used as control channels in the ALOHA multiple access method for transmission from the mobile station to the base station.

In particular, an advantageous encoding, as is used in existing services, is possible with this modification, because transmission of the data packets is effected in blocks, with a block being transmitted in four time slots within a multiframe.

An advantageous embodiment of this modification is characterized by the transmission of the identification number from the mobile station in time slots of predetermined frames of a dedicated channel, and of data in the remaining time slots of the frames of the dedicated channel, in addition to the transmission of further control information, with four even-numbered time slots and four odd-numbered time slots being associated with a mobile station.

Compatibility with existing services is also made possible by another modification of the invention in that, for transmission from the base station to a mobile station, the time slots of predetermined frames of a dedicated channel are used as a control channel in a mobile radio network according to the GSM standard. In this instance, a simultaneous, quasi-permanent connection is preferably made possible by the fact that the time slots that form the common control channel each contain paging messages related to mobile stations for which the data transmitted in the subsequent time slot are specified, or are related to other, arbitrary mobile stations that may subsequently transmit data in blocks.

As in the first modification, in this modification the transmission of the data packets in data blocks contributes to advantageous encoding, with a block being transmitted in four time slots within a multiframe. In transmission from the base station to the mobile station, it is also advantageous for a paging message for the subscribing mobile station to be transmitted in time slots of predetermined frames of a dedicated channel, in addition to further control information, and for data to be transmitted in the remaining time slots of the frames of the dedicated channel, with four even-numbered time slots and four odd-numbered time slots being allocated to a mobile station activated for packet-wise data transmission.

Because the identification numbers are only temporary and are only allocated to one cell, there is no need for a large number of different identification numbers; therefore, it is provided in an advantageous embodiment that the identification number encompasses seven binary locations. The identification number is transmitted with encoding in order to protect the data.

In accordance with another modification of the invention, no additional encoding devices are necessary for encoding the data packet if the data packets are transmitted with a code that is also provided for the control channels.

In many applications, identification and/or correction of transmission errors is not necessary within the scope of the method of the invention, for example if the subscribers perform these measures in their region. However, the method of the invention provides a simple option of increasing transmission reliability in that, if a data block is received erroneously, which is determined, for example, by evaluation of parity bits, the transmitting station is prompted by means of an error message to re-transmit the data packet. The error message is preferably formed from a predetermined value of a bit of an octet containing the identification number.

One advantageous embodiment of the method of the invention provides that no check or control of the transmitting power is effected by way of the receiving field intensity during transmission from the base station to mobile stations.

Another advantageous embodiment is characterized by the fact that the packet-wise data transmission is preferably effected on the carrier that also transmits the broadcast channel. No transmitting power check is performed for this channel anyway.

Packet-wise data transmission can also be performed in a mobile radio network, in that the piece of information indicating that packet-wise data transmission is to be effected, and the number of available blocks, are transmitted from the mobile station in the establishment of a connection originating from a mobile station.

It can be provided that the piece of information indicating that packet-wise data transmission is desired, and the number of data blocks, are transmitted directly with the channel request, or when the base station has granted immediate access following a channel request.

Packet-wise data transmission can also be initiated in the reverse direction, in that the mobile station is paged by the base station, a stand-alone dedicated control channel (SDCCH) is allocated and an L3 message that indicates the end of transmission and the one-way property of the channel is transmitted. Moreover, a broadcast channel can preferably be used for packet-wise data transmission from the base station to the mobile station, and the addressing and possibly data protection can be performed with means that are known per se.

BRIEF DESCRIPTION OF THE DRAWINGS

Embodiments of the invention are illustrated by way of a plurality of drawing figures and described in detail in the ensuing description. Shown are in.

Figure 1:
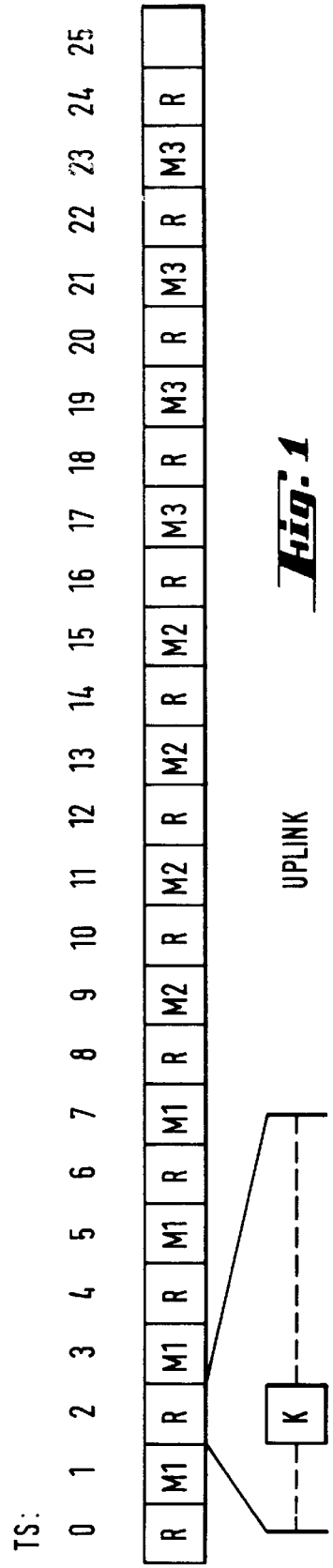
FIG. 1 the structure of a multiframe which has 26 time slots and is used to transmit data packets from a base station to a mobile station, and FIG. 2 a structure of a multiframe having 26 time slots for transmitting data packets from a mobile station to a base station.

To incorporate standard technical language, English terms, as defined in the GSM standard, are used in the following description of the embodiment. Normally, a plurality of frequencies is available for establishing a radio connection between the mobile stations and a respective base station. Each of these frequencies is modulated with a time-division multiplex signal divided into time slots having 156.25 bit periods each. Eight time slots form a frame, of which 26 or 51 in turn form a multiframe; 51 or 26 multiframes form a superframe, and 2048 superframes form a hyperframe. A physical channel is defined by a sequence of frames, a number of a time slot and a frequency hopping sequence.

Logical channels serve either to transmit the useful data (traffic channels TCH) or to transmit control information (control channels CCH)—also referred to hereinafter as signalling. The traffic channels and control channels are subdivided into a larger number of categories corresponding to their data rate and their special job; in the ensuing description, these categories are only mentioned as needed to explain the invention.

The service offered with the method of the invention is referred to hereinafter as GPRS (general packet radio services). A request for this service can originate from a mobile station or a subscriber of a stationary telecommunications network. The destination can likewise be a (different) mobile station or a subscriber of a stationary telecommunications network. For the purpose of explaining the invention, only the segment between one mobile station and one base station or vice versa is discussed. The state of the network in which a packet-wise transmission of data is possible following the establishment of a connection is called a quasi-permanent connection.

In the described embodiment, the normal traffic channels TCH are used as GPRS channels for transmitting the data packets. In this instance, the number of channels kept ready for GPRS can be fixedly predetermined or varied depending as needed. Two different channels serve in transmission from a mobile station to a base station (uplink UL). Of these, the one channel is used as a control channel R (FIG. 1) and represents the random access control channel (RACH) that has been modified for GPRS purposes. In the multiframe illustrated in FIG. 1, all even-numbered time slots TS, namely time slots 0, 2, . . . 24, are used as R channels. Both the burst type and the encoding are structured to correspond to the unmodified RACH channel.

The R channel contains 7 bits for the identification number K, which can correspondingly assume values between 0 and 127. A further bit is provided for the request for capacity from the mobile station to the base station if it assumes the value of 0; in the case of the value 1, an error message is sent in the event that an error is identified during data transmission in the opposite direction. There are 13 GPRS-RACH time slots per multiframe.

Four time slots are provided for each message M. The distribution of messages over the time slots (interleaving) and the encoding are effected in the same manner as the signalling in the control channels. In the example illustrated in FIG. 1, three messages that each have four time slots are distributed over the multiframe as follows:

M1=TS 1, 3, 5, 7,

M2=TS 9, 11, 13, 15,

M3=TS 17, 19, 21, 23.

The time slot TS 25 thereby remains free. Depending on the particular circumstances, a different interleaving can be selected in detail to increase the transmission quality.

Figure 2:
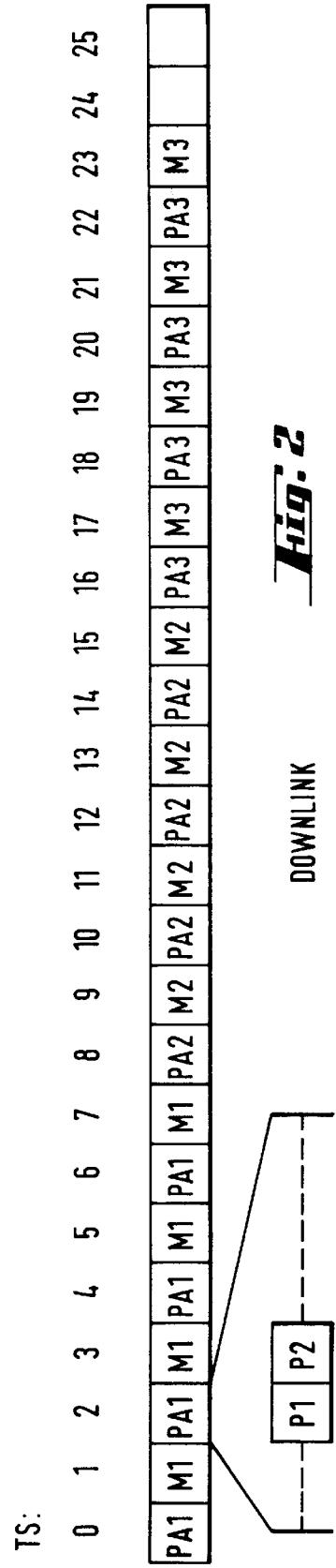
Figure 3:
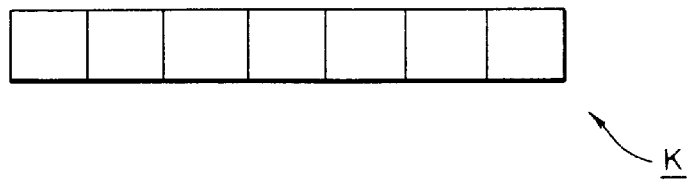
FIG. 3 is a schematic view of seven bits.

In transmission from the base station to the mobile station (downlink DL), the multiframes have the structure shown in FIG. 2. Four even-numbered time slots TS 0 to TS 22 contain a control channel CCCH (common control channel) that was varied with respect to the channel according to the GSM standard in order to perform the method of the invention, and is hereinafter called PA (paging). Three control channels PA1, PA2 and PA3 are provided in the illustrated multiframe.

They each contain information for allocating four time slots M1, M2 or M3, in which the packet-wise data transmission is effected, to a mobile station. The interleaving and encoding of the PA messages correspond to those of conventional signalling in the control channels.

In the PA messages (paging messages), two paging messages P1, P2 are contained per eight bits; the one serves to allocate the four subsequent time slots M to the associated mobile station, while another mobile station can be paged with the aid of the other paging message P2.

As already mentioned, the data are transmitted via the time slots M1, M2 and M3, with four time slots being provided for each message. The interleaving and encoding are again effected as in signalling. Three messages, each having four time slots, are provided for each multiframe, namely the message Ml in time slots 1, 3, 5, 7; the message M2 in time slots 9, 11, 13, 15; and the message M3 in time slots 17, 19, 21 and 23. Time slots 24 and 25 remain free.

The GPRS channel formed by the time slots M operates without encoding; however, the subscribers are anonymous, because the identification numbers K are encoded when assigned. Furthermore, the GPRS channel uses normal SFH (slow frequency hopping). The use of a transmission power control is not readily possible in a GPRS channel, because a return channel is not typically available at the same time in packet-wise data transmission.

To continue the explanation, different procedures for changing from one mode of operation to another are discussed below. Three modes of operation are distinguished: the ready state of a mobile station to receive (idle mode), the pseudopermanent connection, and the transmission of a data packet.

During the idle mode, a mobile station equipped for the GPRS (GPRS-MS), such as a conventional mobile station, is tuned to the BCCH (broadcast control channel).

If a mobile station wishes to change to GPRS mode, it performs random access and switches to the SDCCH (standalone dedicated control channel). A check of authenticity and setting of the encoding mode are subsequently effected in a known manner. Afterwards, a GPRS channel is requested, whereupon the base station allocates the mobile station an identification number that is transmitted to the mobile station in encoded form. A GPRS channel is also allocated, which is again performed in the manner of the normal allocation of a traffic channel TCH. Following this procedure, the mobile station that is still inactive is now tuned to the GPRS channel.

If a different subscriber wishes to communicate with a mobile station via GPRS, a paging of the mobile station MS and a random access are effected in a conventional manner. A switch to SDCCH follows, as do a check of authenticity and setting of an encoding mode. Now the allocation of an identification number and a channel takes place as in the above-described case.

A mobile station that is inactive on the GPRS channel, that is, is in a pseudo-permanent connection with the bases station, wishes to transmit a GPRS message. To this end, random access to one of the R time slots is performed (FIG. 1). The network or the base station then determines the time advance (TA) and, with PA, allocates four uplink time slots M (FIG. 2). If need be, information regarding the transmission power check can also be transmitted. The two paging messages P1 and P2 in PA are only used if data are to be transmitted to other mobile stations suited for GPRS and are tuned to the same GPRS channel, or if transmission errors are to be corrected.

If a GPRS message is present for a mobile station, the mobile station is paged via P1 of a PA message. Consequently, this mobile station is allocated the same four time slots in downlink that the above-described mobile station is allocated for uplink. A time control TA and a transmission power check are not necessary in this instance.

If a normal telephone call is present for a mobile station, calling takes place via P2 of a PA message. The consequence of this is that the called mobile station switches to the BCCH and random access is performed there, after which the further steps are performed as in the establishment of a normal mobile telephone connection.

In the embodiment, no identification signal is provided for correctly-received M messages. If, however, an M message has been erroneously received by a mobile station, this is determined with an evaluation of the parity bit. The base station is then informed by way of random access, in which the eighth bit is set to "1," that the last message must be repeated. The same method is performed in transmission from a mobile station to a base station, with the error message being transmitted via P2 by setting the eighth bit to "1".

The end of the pseudo-permanent connection can be effected from the side of the mobile station in that the mobile station sends a message on the normal RACH, SDCCH and announces the end—possibly including the statement of the identification number of the identification number and the channel. If a stationary network subscriber ends the connection, the base station (BSS) pages the mobile station via P2, whereupon the mobile station answers via RACH, SDCCH, where the base station announces the end to the mobile station.

If a mobile station no longer receives the PA and M messages well, or determines through comparison that other base stations have a better C1 value, the station itself informs the new BTS, stating the identification number, the old base station and the old GPRS channel as a CALL reference (a type of CALL re-establishment). Thus, the handover is the responsibility of the mobile station.

As an alternative, the mobile station on the BCCH, RACH can switch to SDCCH, where a normal transmission of measured values tales place. In this case, the BSS initiates the handover.

A further alternative, the BSS polls the mobile stations suspected of having been handed over in order to transmit the taken measurements when uplink M capacity is free. The BSS then initiates the handover.

Figure 4:
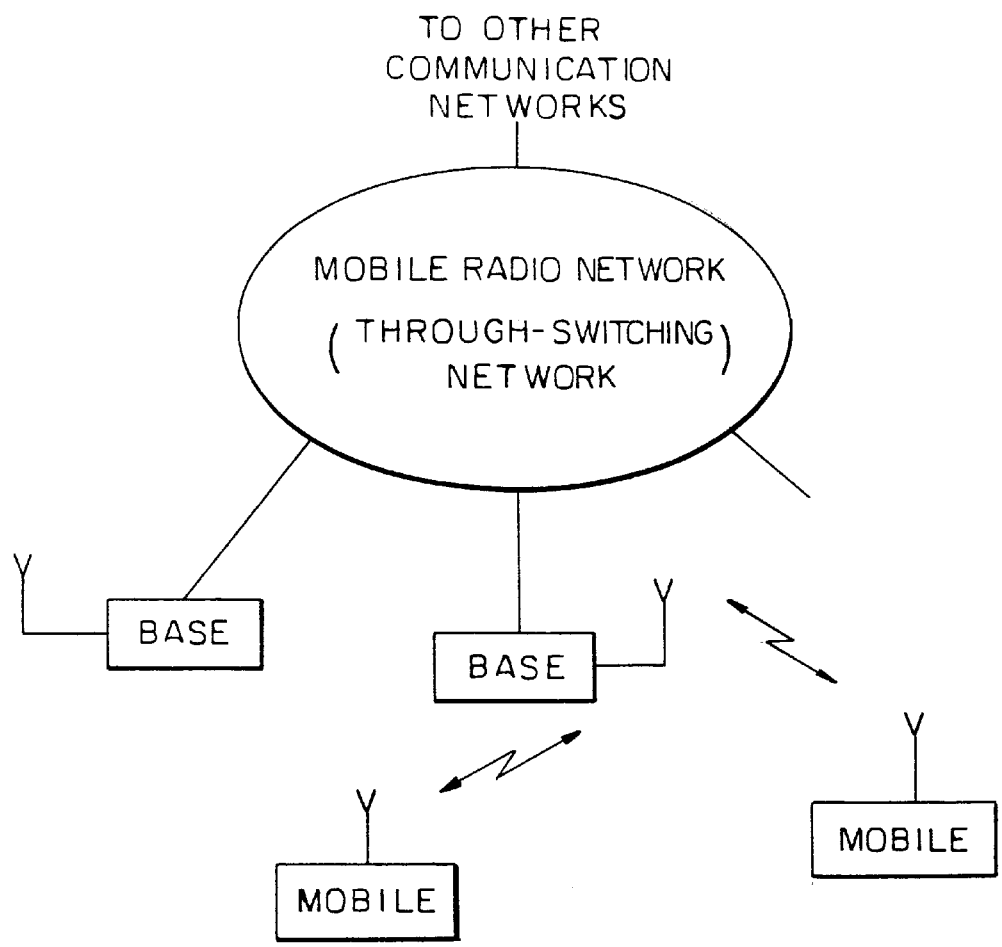
FIG. 4 is a schematic view of the invention.

The invention is shown in schematic overview in FIG. 4.

In summary, the present invention contemplate a method of establishing a radio communication link between a base station and a mobile station via a radio communication channel, where the communication channel includes data packets and is divided into a control channel and an associated traffic channel, so that each packet includes control data and message data. An identification number, which is to be associated with one mobile station, is created for labeling the packets and placed onto the control channel of each packet. The packets are transmitted on the communication channel between the mobile station and the base station, and the identification number identifies the mobile station associated with the message data.

We claim:

1. A method of transmitting data packets in a mobile radio network configured as a through-switching network and including mobile stations and a base station; the method comprising:

providing traffic channels and a control channel;

allocating to each of the mobile stations a traffic channel whereon the data packets are transmitted;

allocating to each of the mobile stations a respective identification number that is valid for packet data transmission, the identification number not being associated with the mobile stations in a permanent way; and associating data packets in the control channel with respective mobile stations via the identification number;

whereby packets are routed according to the identification number thereof.

2. Method according to claim 1, characterized in that, RACH channels and time slots of predetermined frames of a dedicated channel are used as control channels in an ALOHA multiple access method for transmission from a mobile station to the base station.

3. Method according to claim 2, characterized in that the transmission of the data packets is effected in blocks, wherein a block is transmitted in four time slots within a multiframe.

4. Method according to claim 3, characterized in that, the identification number is transmitted from the mobile station in time slots of predetermined frames of a dedicated channel, and data are transmitted in the remaining time slots of the frames of the dedicated channel, wherein four even-numbered time slots and four odd-numbered time slots are allocated to a mobile station.

5. Method according to claim 1, characterized in that the time slots of predetermined frames of a dedicated channel are used as the control channel for transmission from the base station to a mobile station.

6. Method according to claim 5, characterized in that the time slots that form the control channel respectively contain paging messages relevant for mobile stations for which the data transmitted in the following time slot are specified, or may subsequently transmit data in blocks.

7. Method according to claim 5, characterized in that, in addition to further control information, a paging message for subscribing mobile station is transmitted in time slots of predetermined frames of a dedicated channel, and data are transmitted in the remaining time slots of the frames of the dedicated channel, wherein four even-numbered time slots and four odd-numbered time slots are allocated to a mobile station activated for packet-wise data transmission.

8. Method according to claim 1, characterized in that the identification number encompasses seven binary locations.

9. Method according to claim 1, characterized in that the identification number is transmitted with encoding.

10. Method according to claim 1 characterized in that the data packets are transmitted with a code that is also provided for the control channel.

11. Method according to claim 1 characterized in that, in the event of erroneous reception of a data block, which can be determined, by evaluation of parity bits, a transmitting station is prompted by an error message to re-transmit the data packet.

12. Method according to claim 11, characterized in that the error message is formed by a predetermined value of a bit of an octet that contains the identification number.

13. Method according to claim 1, characterized in that, in transmission from the base station to mobile stations, transmitting power is not affected by radio field intensity at the mobile station.

14. Method according to claim 1, characterized in that the packet data transmission is preferably effected on a carrier that also transmits a broadcast control channel.

15. Method according to claim 1, characterized in that information the packet data transmission is to take place, and a number of available blocks comprising a plurality of time slots, is transmitted in the establishment of a connection originating from a mobile station.

16. Method according to claim 15, characterized in that information the packet data transmission is desired, and a number of data blocks, are transmitted directly with a channel request.

17. Method according to claim 15, characterized in that information the packet data transmission is desired, and the number of data blocks, are transmitted when the base station has granted immediate access following a channel request.

18. Method according to claim 15, characterized in that the mobile station is paged by the base station, that a stand-alone dedicated control channel (SDCCH) is allocated and that an Layer 3 message is transmitted that indicates the end of the transmission and the one-way property of the dedicated control channel.

19. Method according to claim 15, characterized in that a broadcast channel is used for the packet data transmission from the base station to the mobile station.

20. A method of establishing a radio communication link between a base station and a mobile station via a radio communication channel including data packets; the method comprising:

creating an identification number associated with the mobile station, the identification number not being associated with the mobile station in a permanent way;

dividing the communication channel into a control channel and an associated traffic channel, whereby each of the packets includes control data and message data;

including the identification number in the control data, whereby each of the packets comprises the identification number on the control channel and message data on the associated traffic channel; and transmitting the packets on the communication channel between the mobile station and the base station;

whereby the identification number identifies the mobile station associated with the message data.

* * * * *